US010206416B2

(12) United States Patent
Widlak

(10) Patent No.: US 10,206,416 B2
(45) Date of Patent: Feb. 19, 2019

(54) MULTILAYER HIGH PRESSURE CYLINDRICAL VESSEL APT IN PARTICULAR FOR HIGH PRESSURE PROCESSING

(71) Applicant: EXDIN SOLUTIONS SP. Z O.O., Cracow (PL)

(72) Inventor: Grzegorz Widlak, Cracow (PL)

(73) Assignee: EXDIN SOLUTIONS SP. Z O.O (PL)

( * ) Notice: Subject to any disclaimer, the term of this patent is extended or adjusted under 35 U.S.C. 154(b) by 150 days.

(21) Appl. No.: 15/124,006

(22) PCT Filed: Mar. 7, 2014

(86) PCT No.: PCT/PL2014/000019
§ 371 (c)(1),
(2) Date: Sep. 6, 2016

(87) PCT Pub. No.: WO2015/133915
PCT Pub. Date: Sep. 11, 2015

(65) Prior Publication Data
US 2017/0013863 A1   Jan. 19, 2017

(51) Int. Cl.
*A23L 3/015* (2006.01)
*F17C 1/00* (2006.01)
*B30B 11/00* (2006.01)

(52) U.S. Cl.
CPC ............ *A23L 3/015* (2013.01); *B30B 11/002* (2013.01); *F17C 1/00* (2013.01); *A23V 2002/00* (2013.01);
(Continued)

(58) Field of Classification Search
CPC ............... F17C 1/00; F17C 2201/0104; F17C 2203/0631; F17C 2203/0639; F17C 2203/0626; A23L 3/015
(Continued)

(56) References Cited

U.S. PATENT DOCUMENTS

| 614,463 A | 11/1898 | Grove |
| 3,488,160 A | 1/1970 | Noel |
| 2004/0004314 A1 | 1/2004 | Yoneda et al. |

FOREIGN PATENT DOCUMENTS

WO    2012/149979 A1    11/2012

OTHER PUBLICATIONS

International Search Report, PCT/PL2014/000019, dated Nov. 11, 2014, 3 pages.

*Primary Examiner* — Jeffrey Allen
*Assistant Examiner* — Jennifer Castriotta
(74) *Attorney, Agent, or Firm* — Ware, Fressola, Maguire & Barber LLP

(57) ABSTRACT

A multilayer high pressure cylindrical vessel (1) has an inner metal cylinder (3), the inner surface defining an inner volume of the vessel (1) along the radial direction, an outer metal cylinder (4), and one intermediate cylindrical layer sandwiched in space between the inner cylinder (3) and the outer cylinder (4) has and comprising a number of circular wedge segments (51) separated by gaps (52). To improve the vessel there exists an interference fit between the one intermediate cylindrical layer and the adjoining solid cylinders and said gaps (52) are broken by bridges (522) connecting angularly adjacent circular segments (51) and defining two axially adjacent gap sections (521) so that the cylindrical layer is a single cylindrical element (5), and the circular wedge segments (51) separated by gaps (52) both extend in parallel to each other along the longitudinal axis of the vessel (1).

9 Claims, 2 Drawing Sheets

(52) U.S. Cl.
CPC ............... *F17C 2201/0104* (2013.01); *F17C 2203/0631* (2013.01); *F17C 2203/0639* (2013.01)

(58) Field of Classification Search
USPC .................. 220/586, 560.12, 560.04, 581
See application file for complete search history.

MULTILAYER HIGH PRESSURE CYLINDRICAL VESSEL APT IN PARTICULAR FOR HIGH PRESSURE PROCESSING

The invention relates to a multilayer high pressure cylindrical vessel comprising an inner metal cylinder, the inner surface of which defines inner volume of the chamber along the radial direction, an outer metal cylinder, and one intermediate cylindrical layer sandwiched in the space between the inner cylinder and the outer cylinder and comprising a number of circular wedge segments separated by gaps.

BACKGROUND OF THE INVENTION

High pressure cylindrical vessels are successfully utilized in different high pressure applications. In particular they are used in food High Pressure Processing (HPP) systems also known as Pascalization. Some HPP systems are based on monoblock pressure cylinders that cause concerns with limited life cycle resulting in dangerous fatigue failures posing even a threat of explosions. In order to increase the pressure capacity of cylindrical chambers a number of techniques have been utilized in order to produce favourable residual stresses, including multilayer construction and autofrettage.

Multilayer vessels are assembled so as to have an interference fit between respective cylinders. This results in compressive residual stresses in the inner cylinder and tensile residual stresses in the outer cylinder. The interference fit between layers may be accomplished by heating and then shrinking the outer cylinder having a bore diameter slightly smaller than that of the respective inner cylinder or by having matched tapers on the inside and outside surface of the outer and inner cylinders respectively and forcing the elements into each other by means of press. The resultant interface pressures, residual stresses, operating stresses and the pressure capacity are a function of numerous variables including number of cylinders, their relative strengths, stiffness and diameter ratios.

In autofrettage method, residual stresses are induced by subjecting a thick-walled cylinder to an internal pressure exceeding its yield pressure. That leads to a plastic deformation that initiates at the bore and, as the pressure increases, proceeds through the cylinder wall. After the internal pressure is released, due to elastic recovery, the material near the outside surface of the cylinder, which has been deformed the least amount, will attempt to return to its original diameter and the material near the bore, which has been deformed the most, will attempt to remain deformed. This results in a residual compressive stress at the bore and a residual tensile stress at the outside surface with a gradual transition through the wall thickness. Autofrettage has been utilized for many years in the manufacture of gun barrels and in recent years it has also been applied to pressure vessels designed to operate at very high pressures.

Both multilayer and autofrettage techniques may be combined together in order to provide higher pressure capacity of the vessel. In that case, the most inner cylinder made of a high strength metal is autofrettaged and combined with jacket of outer cylinders which may be made of lower strength steels.

Maximum equivalent stresses of any thick-walled cylinder subjected to internal pressure appear at radially inner surface of this cylinder (effect known as Lame Problem). The predominant stress component which is influencing vessel capacity is tangential (hoop) stress. The same component determines response also for multilayer and/or or autofrettaged constructions. Therefore a construction of a multilayer cylindrical vessel has been proposed having an intermediate cylindrical layer sandwiched between the inner cylinder and the outer cylinder, said intermediate layer formed of a number equiangularly distributed circular segments separated by gaps. Each segment of such a segmented layer is no longer restricted in circumferential direction, so that tangential stresses are eliminated and only radial stresses are transmitted between the inner cylinder and the outer cylinder. Obviously such a sectioned layer may not be the innermost layer of a pressure vessel since it would not provide a fluid tight surface of such a vessel. Nonetheless the inner cylinder supported by the segments can either be a thin liner preventing the pressure fluid from entering the spaces between the segments or thick cylinder forming a structural component of the pressure vessel.

Such a multilayer construction with a segmented intermediate cylindrical layer has higher resistance to fatigue and increases pressure capacity of the vessel. It is however problematic from fabrication and assembling point of view.

Another exemplary multilayer wall pressure vessel has been disclosed in the U.S. Pat. No. 3,488,160.

It has been the object of the present invention to provide a durable and cost-effective multilayer high pressure cylindrical vessel devoid of the drawbacks of the prior art solutions which would be simply to assemble and would feature a pressure capacity and fatigue life comparable to vessels provided with an angularly segmented intermediate layer.

SUMMARY OF THE INVENTION

The invention provides a multilayer high pressure cylindrical vessel of the kind mentioned in the outset, characterised in that, it is provided with one intermediate cylindrical element sandwiched in the space between the inner cylinder and the outer cylinder and comprising a number of circular wedge segments separated by gaps, wherein there exists an interference fit between said one intermediate cylindrical layer and the adjoining solid cylinders and said gaps are broken by bridges connecting angularly adjacent circular segments and defining two axially adjacent gap sections, so that said cylindrical layer is a single cylindrical element, and the circular wedge segments separated by gaps both extend in parallel to each other along the longitudinal axis of the vessel.

Preferably the bridges have the same axial locations between every two gaps in angular direction.

In this case preferably bridges in a given gap are located in the centres of the gap sections of angularly adjacent gaps.

In an alternative, preferred embodiment the bridges are disposed in offset with relation to each other forming a spiral line running through all the bridges around the axis of the cylindrical element.

Preferably the ratio between the length of the gap section and the length of the bridge is in a range of 1 to 10000.

Preferably the width of the gap remains constant along the radial direction.

Preferably the angular length of each pair of the segment and the gap is in a range between 5 and 90°.

Preferably inner cylinder and/or outer cylinder is/are autofrettaged.

Preferably inner cylinder, outer cylinder and/or a prefabricate for said at least one intermediate cylindrical layer is/are made of forged cylinder(s). This further enables to reduce the costs of manufacturing the vessel according to the present invention.

The intermediate layer has a remarkably low tangential stiffness and its functionality is comparable to a layer comprising a number of entirely separated segments, yet it forms a single element which is easier to insert between adjoining cylinders with an interference fit. An external pressure applied by means of mechanical contact force from the outer cylinder is transmitted radially to the inner cylinder, so that surface contact is intensified and the inner cylinder is compressed.

BRIEF DESCRIPTION OF DRAWINGS

The invention shall be described and explained below in connection with the attached drawings on which.

DETAILED DESCRIPTION OF PREFERRED EMBODIMENTS

Figure 1:
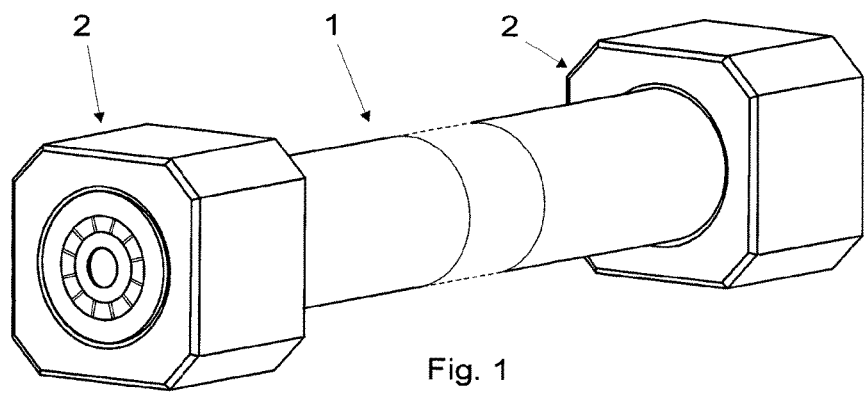
FIG. 1 is a schematic perspective view of a multilayer high pressure cylindrical vessel according to the present invention.

An exemplary embodiment of a multilayer high pressure cylindrical vessel 1 shown in in FIG. 1 comprises two axial closures 2 known to those skilled in the art that shall not be described in detail. Obviously the vessel 1 may be closed by various types of closure systems such as yoke frame, threaded closure, gate valve, pin closure, breech closure etc. Furthermore the vessel 1 may be used for various applications, and in particular for food High Pressure Processing.

Figure 2:
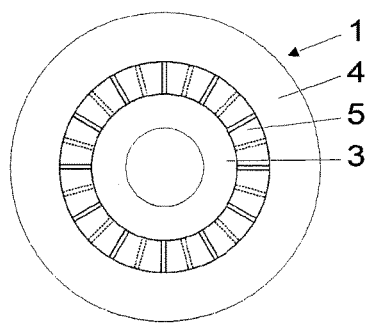
FIG. 2 is a schematic cross-sectional view of the vessel shown in FIG. 1.

As shown in FIG. 2 the vessel 1 comprises inner metal cylinder 3, outer metal cylinder 4 and an intermediate cylindrical layer 5 sandwiched between the inner cylinder 3 and the outer cylinder 4.

Cylinders 3 and 4 are made of high strength alloy steel. Cylindrical layer 5 is made of common steel as it is not subjected to significant stresses. Inner diameters of cylinder 3, cylindrical layer 5 and outer cylinder 4 amount respectively 63 mm, 118 mm and 170 mm. Outer diameter of the vessel 1 amounts 250 mm. To reduce the costs of manufacturing the vessel these dimensions were chosen in order to utilize standard forged cylinders as the inner cylinder 3, the outer cylinder 4 and a prefabricate for the intermediate cylindrical layer 5.

Obviously unrestricted diameters and thickness relations of the cylinders 3, 4 and the cylindrical layer 5 can be combined together depending on desired pressure resistance and vessel capacity with respect to fabrication costs. Moreover the length of the vessel may be freely changed according to practical applications.

The intermediate cylindrical layer 5 after assembling is compressed in a radical direction between cylinders 3 and 4, as there exists an interference fit so of about 0.2 mm between the layer 5 and the inner cylinder 3, as well as between the layer 5 and the outer cylinder 4.

Figure 3:
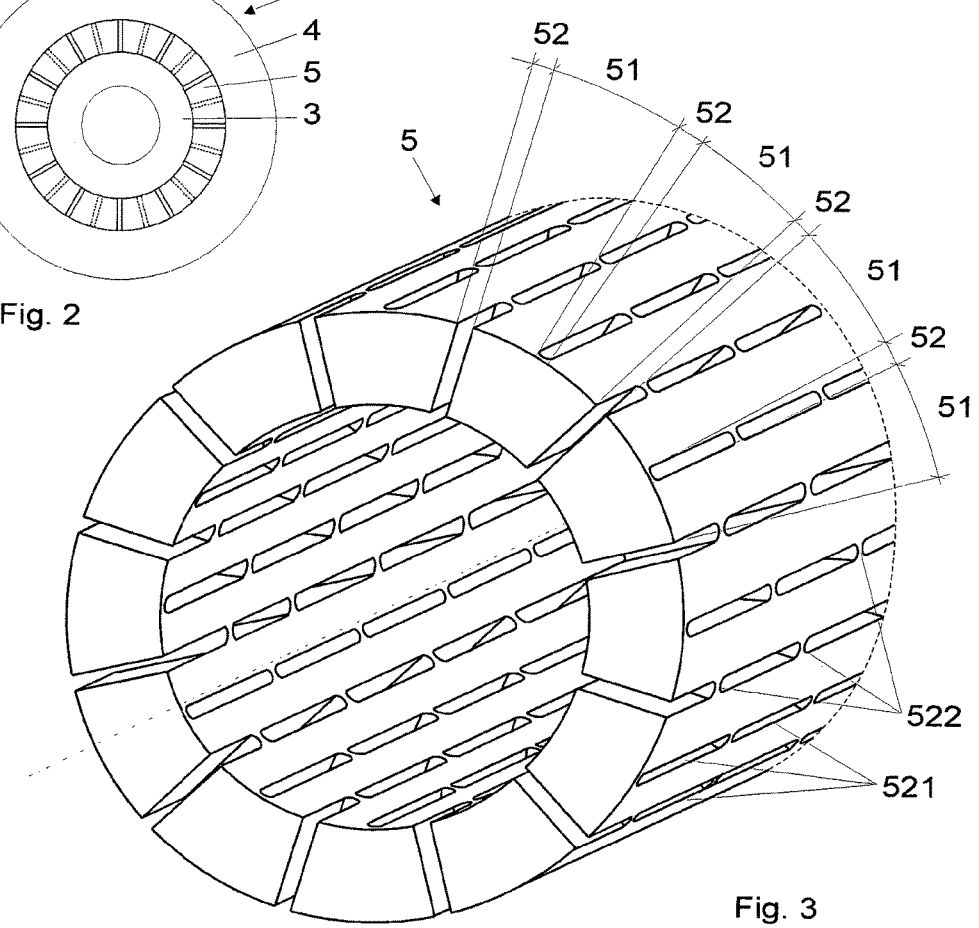
FIG. 3 is a schematic perspective view of a fragment of an intermediate cylindrical layer of the vessel shown in FIG. 1.

FIG. 3 shows in details the intermediate layer 5 of the vessel 1. As shown the layer 5 comprises twenty-four equiangularly disposed circular segments 510 (see all twenty-four segments in FIG. 2 illustrated in a different cross-section than that of FIG. 3) separated by gaps 52, both extending in parallel to each other along the longitudinal axis of the vessel 1. As a pair, the segment 51 and the gap 52 have an angular length of 15°, giving rise to the twenty-four equiangular segment 51 and gap 52 pairs.

Each gap 52 does not entirely separate the angularly adjacent segments 51 but is broken by equidistantly disposed bridges 522 having rounded edges. Bridges 522 connect angularly adjacent segments 51, as well as separate each two axially adjacent gap sections 521.

The structure of bridges 522 and gap sections 521 may be formed by water jet cutting, milling or any other machining technology known to those skilled in the art that shall not be described in detail.

Figure 4:
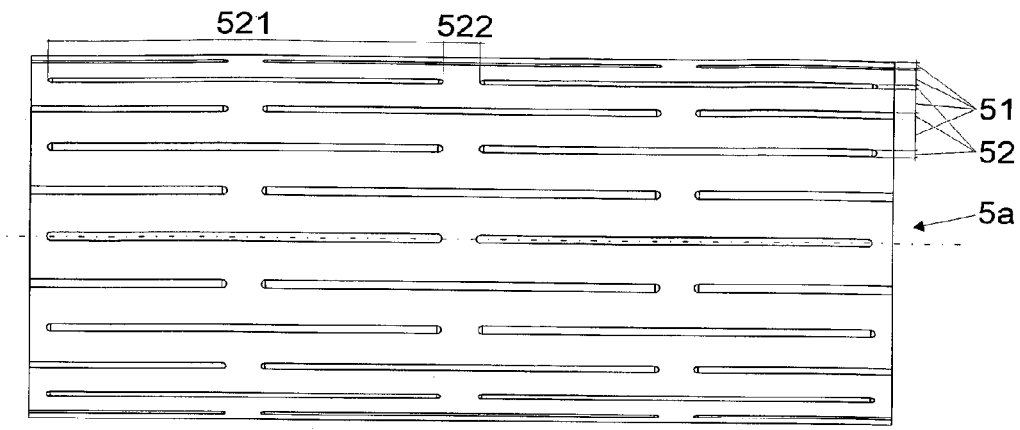
FIG. 4 is a schematic top view of a fragment of another embodiment of an intermediate cylindrical layer.

In an embodiment of the intermediate layer 5a shown in FIG. 4 axial length of each gap section 521 amounts 180 mm, axial length of each bridge 522 amounts 20 mm and the width of the gap 52 amounts 4 mm and remains constant along the radial direction.

In embodiments of the intermediate layer 5 and 5a shown in FIG. 3 and FIG. 4 the bridges 522 are alternately disposed in consecutive gaps 52, i.e. the bridges 522 have the same locations along the longitudinal axis between every two alternate gaps 52. Furthermore the bridges 522 in a given gap 52 are located in the centres of the gap sections 521 of angularly adjacent gaps 52.

Figure 5:
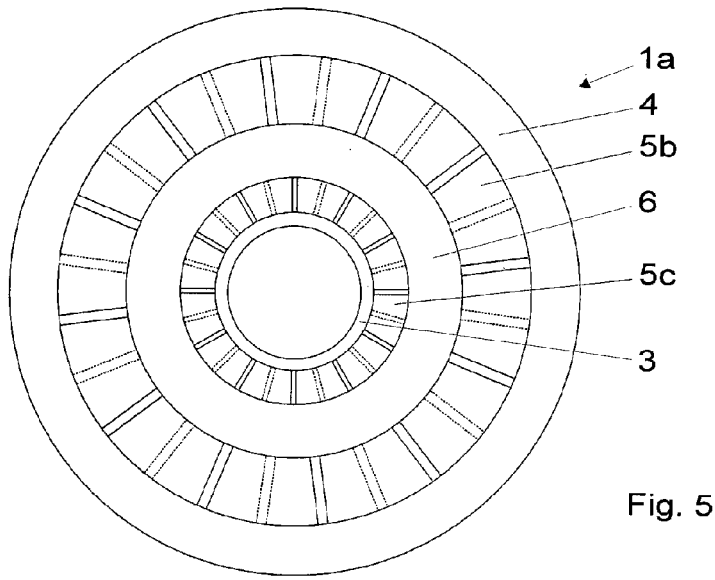
FIG. 5 is a schematic cross-sectional view of another embodiment of a multilayer high pressure cylindrical vessel according to the present invention.

In an another embodiment of the vessel according to the present invention shown in FIG. 5 the vessel 1a comprises two intermediate layers 5b and 5c and sandwiched in the space between the inner cylinder 3 and the outer cylinder 4. Both layers 5b and 5c are separated by an additional intermediate solid cylinder 6.

Figure 6:
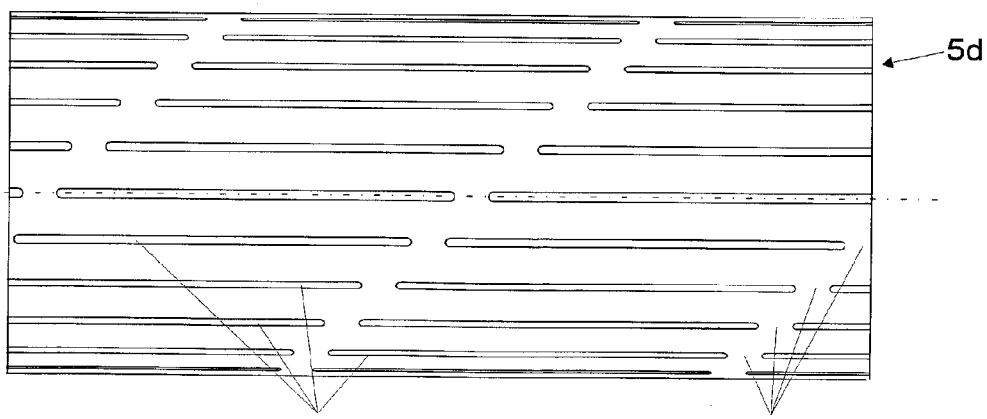
FIG. 6 is a schematic top view of a fragment of yet another embodiment of an intermediate cylindrical layer of the vessel according to the present invention.

FIG. 6 shows an another embodiment of an intermediate layer 5d in which the bridges 522 are disposed in offset with relation to each other forming a spiral line running through all the bridges 522 around the axis of the layer 5d.

The above embodiments of the present invention are merely exemplary. The figures are not necessarily to scale, and some features may be exaggerated or minimized. These and other factors, however, should not be considered as limiting the spirit of the invention, the intended scope of protection of which is indicated in appended claims.

The invention claimed is:

1. A multilayer high pressure cylindrical vessel (1) comprising
   a solid inner metal cylinder (3), the inner surface of which defines inner volume of the vessel (1) along a radial direction,
   a solid outer metal cylinder (4), and
   one intermediate cylindrical layer sandwiched in between the inner cylinder (3) and the outer cylinder (4) and comprising a number of circularly disposed wedge segments (51) separated by gaps (52),
   wherein,
   there exists an interference fit between said one intermediate cylindrical layer, the inner cylinder (3) and the outer cylinder (4), and
   said gaps (52) are broken by bridges (522) connecting angularly adjacent wedge segments (51) and defining two axially adjacent gap sections (521), so that said cylindrical layer is a single cylindrical element (5), and the circularly disposed wedge segments (51) separated by gaps (52) extend in parallel to each other along a longitudinal axis of the vessel (1).

2. The high pressure cylindrical vessel according to claim 1, characterised in that, the bridges (522) of the cylindrical element (5, 5*a*) have the same locations along the longitudinal axis between every two gaps (52) in an angular direction.

3. The high pressure cylindrical vessel according to claim 2, characterised in that, the bridges (522) of the cylindrical element (5, 5*a*) in a given gap (52) are located in the centres of the gap sections (521) of angularly adjacent gaps (52).

4. The high pressure cylindrical vessel according to claim 3, characterised in that, the ratio between the length of the gap section (521) and the length of the bridge (522) is in a range between 1 to 10000.

5. The high pressure cylindrical vessel according to claim 1, characterised in that, the bridges (522) are offset in relation to each other forming a spiral line running through all the bridges (522) around the longitudinal axis of the vessel (1).

6. The high pressure cylindrical vessel according to claim 1, characterised in that, the width of the gap (52) remains constant along the radial direction.

7. The high pressure cylindrical vessel according to claim 1, characterised in that, an angular length of each pair of the wedge segments (51) and the gaps (52) is in a range between 5° and 90°.

8. The high pressure cylindrical vessel according to claim 1, characterised in that, at least one of the inner cylinder (3) and the outer cylinder (4) is autofrettaged.

9. The high pressure cylindrical vessel according to claim 1, characterised in that, at least one of the inner cylinder (3), the outer cylinder (4), and a prefabricate for said intermediate cylindrical layer (5) is a forged cylinder.

* * * * *